United States Patent
Ide

(10) Patent No.: US 10,515,278 B2
(45) Date of Patent: Dec. 24, 2019

(54) DRIVING ASSISTANCE DEVICE

(71) Applicant: TOYOTA JIDOSHA KABUSHIKI KAISHA, Toyota-shi, Aichi-ken (JP)

(72) Inventor: Hirohito Ide, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 198 days.

(21) Appl. No.: 15/847,486

(22) Filed: Dec. 19, 2017

(65) Prior Publication Data

US 2018/0181820 A1 Jun. 28, 2018

(30) Foreign Application Priority Data

Dec. 27, 2016 (JP) ................................. 2016-253250

(51) Int. Cl.
*G06K 9/00* (2006.01)
*B60W 30/12* (2006.01)
(Continued)

(52) U.S. Cl.
CPC ......... *G06K 9/00798* (2013.01); *B60W 30/12* (2013.01); *B60W 30/143* (2013.01);
(Continued)

(58) Field of Classification Search
CPC .......... G08G 1/056; G08G 1/167; G08G 1/16; G08G 1/166; B62D 15/02; B62D 15/026; B62D 15/025; B62D 6/00; B62D 6/003; B62D 5/0457; B60W 50/0225; B60W 30/182; B60W 40/114; B60W 30/12; B60W 30/143; B60W 10/18; B60W 10/20; B60W 40/09; B60W 30/16; B60W 30/045; B60W 10/04; B60W 30/18163; B60W 40/08;
(Continued)

(56) References Cited

U.S. PATENT DOCUMENTS 7,668,638 B2    2/2010  Saeki
2010/0324797 A1 12/2010 Fritz
(Continued)

FOREIGN PATENT DOCUMENTS

JP    2004-322916 A    11/2004
JP    2006-315491 A    11/2006
(Continued)

*Primary Examiner* — Behrang Badii
(74) *Attorney, Agent, or Firm* — Sughrue Mion, PLLC

(57) ABSTRACT

A driving assistance device includes an electronic control unit. when a recognition situation of a division line of a traveling lane along which a vehicle is traveling is a near-side recognizable situation in which a forward and far division line of the vehicle is not recognized and a forward and near division line of the vehicle is recognized, the electronic control unit performs lane trace control set, to a target traveling line, a corrected traveling trajectory in which at least one of i) a position of a near target traveling line constituted by a central position of the traveling lane determined based on the recognizable forward and near division line or a position located within a predetermined lateral distance from the central position in a lane-width direction and ii) a tangential direction of the near target traveling line is applied to the traveling trajectory to correct the traveling trajectory.

5 Claims, 8 Drawing Sheets

(51) Int. Cl.
*B60W 30/14* (2006.01)
*B62D 15/02* (2006.01)
*G08G 1/16* (2006.01)
*G08G 1/056* (2006.01)
*G01C 21/30* (2006.01)

(52) U.S. Cl.
CPC ....... *B62D 15/026* (2013.01); *G06K 9/00825* (2013.01); *G08G 1/167* (2013.01); *B62D 15/02* (2013.01); *G01C 21/30* (2013.01); *G08G 1/056* (2013.01)

(58) Field of Classification Search
CPC ....... B60W 30/14; B60W 30/09; B60K 28/10; B60K 31/00; B60K 28/06; B60K 28/066; G06K 9/00798; G06K 9/00825; G06K 9/00228; G06K 9/00845; G06K 9/52; G06K 9/00281; G01C 21/30; G05D 1/0214; G05D 1/0061; G05D 1/0088; G08B 21/02; H04N 13/204; G06T 7/593; G06T 7/73; G06T 7/292; B60R 11/04
See application file for complete search history.

(56) References Cited

U.S. PATENT DOCUMENTS

| | | | |
|---|---|---|---|
| 2012/0215377 | A1 | 8/2012 | Takemura et al. |
| 2015/0307095 | A1 | 10/2015 | Aso |
| 2016/0003630 | A1* | 1/2016 | Higuchi ................ G08G 1/056 701/41 |
| 2016/0114811 | A1* | 4/2016 | Matsuno ........... B60W 50/0225 701/23 |
| 2016/0121906 | A1* | 5/2016 | Matsuno ................ B60K 28/10 701/23 |
| 2016/0288790 | A1 | 10/2016 | Aoki et al. |
| 2019/0101916 | A1* | 4/2019 | Sen ..................... B60W 30/182 |

FOREIGN PATENT DOCUMENTS

| | | |
|---|---|---|
| JP | 4172434 B2 | 8/2008 |
| JP | 2011-073529 A | 4/2011 |
| JP | 2011-514580 A | 5/2011 |
| JP | 4929777 B2 | 2/2012 |
| JP | 2014-148293 A | 8/2014 |
| JP | 2015-210720 A | 11/2015 |
| JP | 2016-190519 A | 11/2016 |

* cited by examiner

DRIVING ASSISTANCE DEVICE

INCORPORATION BY REFERENCE

The disclosure of Japanese Patent Application No. 2016-253250 filed on Dec. 27, 2016 including the specification, drawings and abstract is incorporated herein by reference in its entirety.

BACKGROUND

1. Technical Field

The disclosure relates to a driving assistance device that executes lane trace control for assisting the traveling of a vehicle (host vehicle) in the vicinity of a lane center with the utilization of a traveling trajectory of a preceding vehicle and a white line.

2. Description of Related Art

In the related art, a driving assistance device is known which controls a steering assist torque so as to recognize a lane division line such as a white line or a yellow line of a road using a camera mounted in a host vehicle, and make the host vehicle travel at an appropriate position within a "traveling lane specified by the recognized lane division line". Further, a driving assistance device is known which performs lateral direction control (steering control) with the utilization of the traveling trajectory of a preceding vehicle with respect to the host vehicle (see, for example, Japanese Unexamined Patent Application Publication No. 2004-322916 (JP 2004-322916)).

As typical control executed by such a driving assistance device, lane trace control is known for assisting traveling in the vicinity of a lane center with the utilization of a white line or the traveling trajectory of a preceding vehicle.

In a case where the lane trace control is executed, the driving assistance device detects right and left white lines of a road using, for example, a camera sensor, and sets a central line which is a central position of the right and left white lines as a target traveling line (target traveling road). Further, in a situation where a far white line is unable to be recognized in a traffic jam scene or the like, the driving assistance device sets the target traveling line with the utilization of the traveling trajectory of a preceding vehicle. Further, the driving assistance device assists a driver's steering operation by giving a steering assist torque to a steering mechanism so that the traveling position of a host vehicle is maintained in the vicinity of the target traveling line.

SUMMARY

Incidentally, in a case where the target traveling line is set with the utilization of the traveling trajectory of a preceding vehicle, the following problem may occur. That is, the preceding vehicle does not necessarily travel along the vicinity of the center of a traveling lane. Therefore, in a case where the target traveling line is set with the utilization of the traveling trajectory of the preceding vehicle, the target traveling line may deviate from the vicinity of the center of the traveling lane. In this case, there is a relatively high possibility of the host vehicle not being able to travel along the vicinity of the center of the traveling lane. As a result, there is the possibility of the accuracy of the lane trace control further decreasing.

An aspect of the disclosure provides a driving assistance device capable of further improving the accuracy of lane trace control in a case where the lane trace control is executed with the utilization of the traveling trajectory of a preceding vehicle.

An aspect of the disclosure relates to a driving assistance device including an electronic control unit. The electronic control unit is configured to recognize a division line of a traveling lane along which a vehicle is traveling, and specify a preceding vehicle traveling in front of the vehicle to generate a traveling trajectory of the specified preceding vehicle. The electronic control unit is configured to set a target traveling line based on at least one of the division line and the traveling trajectory to execute lane trace control for controlling steering of the vehicle so as to make the vehicle travel along the target traveling line. In addition, in a case where a recognition situation of the division line is a near-side recognizable situation in which a forward and far division line of the vehicle is not recognized and a forward and near division line is recognized, the electronic control unit is configured to set, to the target traveling line, a corrected traveling trajectory in which at least one of i) a position of a near target traveling line constituted by a central position of the traveling lane determined based on the recognizable forward and near division line or a position located within a predetermined lateral distance from the central position of the traveling lane determined based on the recognizable forward and near division line in a lane-width direction and ii) a tangential direction of the near target traveling line is applied to the traveling trajectory to correct the traveling trajectory. The corrected traveling trajectory is a trajectory in which a shape of the traveling trajectory is maintained, the trajectory being coincident with a position corresponding to the near target traveling line and the at least one of the position of the near target traveling line and the tangential direction of the near target traveling line.

According to the aspect of the disclosure, in a case where a recognition situation of the division line is a situation (near-side recognizable situation) in which a forward and far division line of the vehicle is unable to be recognized and solely a forward and near division line is able to be recognized, at least one of a position of a near target traveling line constituted by a central position of the traveling lane determined based on the recognizable near division line or a position located within a predetermined lateral distance from the central position in a lane-width direction and a tangential direction of the near target traveling line is applied to the traveling trajectory, and a corrected traveling trajectory obtained by correcting the traveling trajectory so as to form a trajectory in which a shape of the traveling trajectory is maintained, the trajectory being coincident with the applied at least one of the position of the near target traveling line and the tangential direction of the near target traveling line, and a position corresponding to the near target traveling line, is set to the target traveling line. Thereby, as compared with a case where the preceding vehicle trajectory is set to the target traveling line as it is, it is possible to further reduce the possibility of a host vehicle not being able to travel along the vicinity of the center of the traveling lane. As a result, it is possible to further improve the accuracy of the lane trace control utilizing the preceding vehicle trajectory.

In an aspect of the disclosure, in a case where the recognition situation of the division line is a far-side recognizable situation in which the forward and far division line is recognized, the electronic control unit may be configured to set a line, constituted by a central position of the traveling lane determined based on the recognizable forward and far division line or a position located within a predetermined lateral distance from the central position of the traveling lane determined based on the recognizable forward and far division line in a lane-width direction, to the target traveling line. When the lane trace control is executed in a case where the recognition situation of the division line is the near-side recognizable situation, the electronic control unit may be configured to notify a driver of the vehicle that reliability of the lane trace control is lower than that in the far-side recognizable situation.

According to the aspect of the disclosure, it is possible to cause a driver to recognize that the reliability of the lane trace control which is being currently performed further decreases than that of the lane trace control in a case of the far-side recognizable situation. As a result, it is possible to further reduce the possibility of the driver having a sense of discomfort (sense of distrust) in the lane trace control.

In an aspect of the disclosure, in a case where the recognition situation of the division line is a far-side recognizable situation in which the forward and far division line is recognized, the electronic control unit may be configured to determine the central position of the traveling lane based on a pair of the recognizable forward and far division lines.

In an aspect of the disclosure, in a case where the recognition situation of the division line is a non-recognition situation in which the forward and far division line is not recognized and the forward and near division line is not recognized, the electronic control unit may be configured to set the traveling trajectory to the target traveling line. In addition, when the lane trace control is executed in the case where the recognition situation of the division line is the far-side recognizable situation, the electronic control unit may be configured to notify the driver of the vehicle that the reliability of the lane trace control is high. Further, when the lane trace control is executed in the case where the recognition situation of the division line is the non-recognition situation, the electronic control unit may be configured to notify the driver of the vehicle that the reliability of the lane trace control is lower than that in the near-side recognizable situation.

According to the aspect of the disclosure, it is possible to cause a driver to recognize the degree of reliability of the lane trace control which is being currently performed. As a result, it is possible to further reduce the possibility of the driver having a sense of discomfort in the lane trace control.

In an aspect of the disclosure, in the case where the recognition situation of the division line is the near-side recognizable situation, the electronic control unit may be further configured to determine whether the specified preceding vehicle departs from the traveling lane. When the specified preceding vehicle is determined to depart from the traveling lane, the electronic control unit may be configured not to perform the lane trace control.

According to the aspect of the disclosure, since there is the possibility of the traveling trajectory deviating greatly from the vicinity of the center of the traveling line, the traveling trajectory may not be set to the target traveling line. Therefore, in this case, the lane trace control is kept from being performed. Thereby, it is possible to keep the lane trace control having a low reliability from being performed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a vehicle traveling control device (driving assistance device) according to an embodiment of the disclosure will be described with reference to the accompanying drawings.

Configuration

Figure 1:
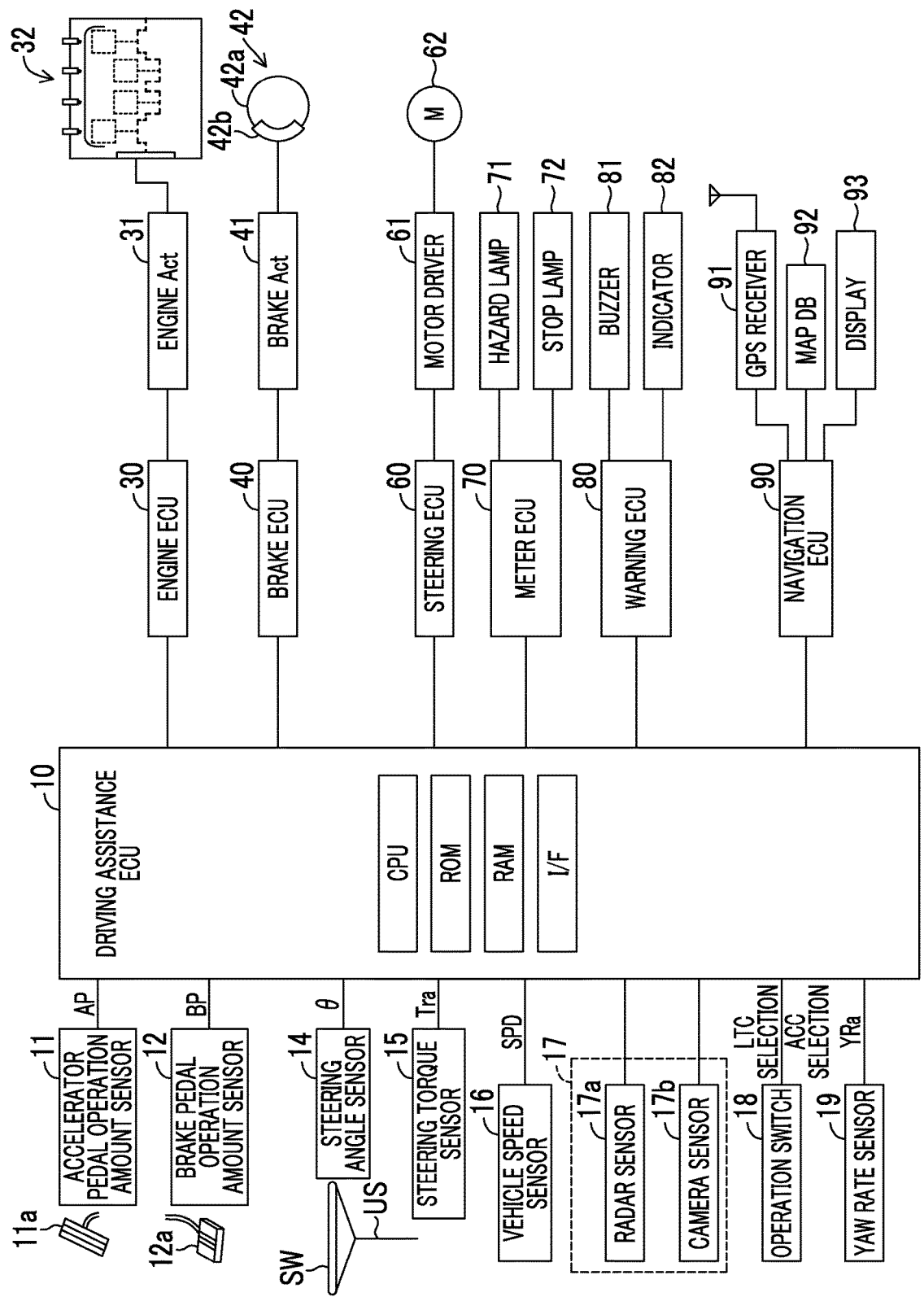
FIG. 1 is a schematic configuration diagram of a vehicle traveling control device according to an embodiment of the disclosure.

The vehicle traveling control device (which may hereinafter be called "the present device") according to the embodiment of the disclosure is applied to a vehicle (which may be called a "host vehicle" below in order to distinguish from other vehicles) as shown in FIG. 1, and includes an driving assistance ECU 10 (an example of an electronic control unit), an engine ECU 30, a brake ECU 40, a steering ECU 60, a meter ECU 70, a warning ECU 80, and a navigation ECU 90.

The ECUs are electronic control units including a microcomputer as a main portion, and are connected to each other so as to be capable of mutually transmitting and receiving information through a CAN (Controller Area Network) which is not shown. In the present specification, the microcomputer includes a CPU, a ROM, a RAM, a non-volatile memory and interface I/F, and the like. The CPU is configured to realize various functions by executing instructions (program, routine) stored in the ROM. Some or all of the ECUs described above may be integrated into one ECU.

The driving assistance ECU 10 is configured to be connected to sensors (inclusive of switches) enumerated below, and to receive detection signals or output signals of the sensors. Meanwhile, the respective sensors may be connected to the ECUs other than the driving assistance ECU 10. In that case, the driving assistance ECU 10 receives the detection signals or output signals of the sensors from the ECUs to which the sensors are connected through the CAN.

An accelerator pedal operation amount sensor 11 is configured to detect the operation amount of an accelerator pedal 11a (accelerator operation amount) of the host vehicle, and to output a signal indicating an accelerator pedal operation amount AP. A brake pedal operation amount sensor 12 is configured to detect the operation amount of a brake pedal 12a of the host vehicle, and to output a signal indicating a brake pedal operation amount BP.

A steering angle sensor 14 is configured to detect the steering angle of the host vehicle, and to output a signal indicating a steering angle θ. A steering torque sensor 15 is configured to detect a steering torque applied to the steering shaft US of the host vehicle through the operation of a steering wheel SW, and to output a signal indicating a steering torque Tra. A vehicle speed sensor 16 is configured to detect the traveling speed (vehicle speed) of the host vehicle, and to output a signal indicating a vehicle speed SPD.

A peripheral sensor 17 is configured to acquire information relating to, at least, a road in front of the host vehicle and a three-dimensional object present on the road. The three-dimensional object indicates, for example, a moving object such as a pedestrian, a bicycle and an automobile, and a fixed object such as an electric pole, a tree and a guardrail. Hereinafter, the above-described three-dimensional object may be called a "target". The peripheral sensor 17 includes a radar sensor 17a and a camera sensor 17b. Meanwhile, the camera sensor 17b may also be called, for convenience, a division line recognition unit.

The radar sensor 17a radiates, for example, radio waves (which hereinafter are called "millimeter-waves") of a millimeter-wave band to the peripheral area of the host vehicle including at least the front area of the host vehicle, and receives millimeter-waves (that is, reflected waves) reflected by a target present within a radiation range. Further, the peripheral sensor 17 is configured to calculate and output the presence or absence of the target and a relative relationship (that is, distance between the host vehicle and the target, relative speed between the host vehicle and the target, and the like) between the host vehicle and the target.

More specifically, the radar sensor 17a includes a processing unit. The processing unit acquires an inter-vehicle distance (longitudinal distance) Dfx(n), a relative speed Vfx(n), a lateral distance Dfy(n), a relative lateral speed Vfy(n) and the like with respect to each detected target (n), each time a predetermined time has elapsed, based on a phase difference between the transmitted millimeter-waves and the received reflected waves, the attenuation level of the reflected waves, a time taken after the millimeter-waves are transmitted and before the reflected waves are received, and the like.

The inter-vehicle distance Dfx(n) is a distance between the host vehicle and the target (n) (for example, preceding vehicle) along the central axis of the host vehicle. The relative speed Vfx(n) is a difference (=Vs−Vj) between the speed Vs of the target (n) (for example, preceding vehicle) and the speed Vj of the host vehicle. The speed Vs of the target (n) is a speed of the target (n) in the traveling direction of the host vehicle. The lateral distance Dfy(n) is a distance of the "central position of the target (n) (for example, vehicle-width central position of a preceding vehicle)" from the central axis in a direction perpendicular to the central axis of the host vehicle. The lateral distance Dfy(n) is also called a "lateral position". The relative lateral speed Vfy(n) is a speed of the central position of the target (n) (for example, vehicle-width central position of the preceding vehicle) in the direction perpendicular to the central axis of the host vehicle.

The camera sensor 17b includes a stereo camera and a processing unit, and captures images of the landscapes of the right area and left area in front of the vehicle to acquire a pair of right and left pieces of image data. The camera sensor 17b is configured to calculate and output the presence or absence of the target, a relative relationship between the host vehicle and the target and the like, based on the right and left pieces of image data captured. In this case, the driving assistance ECU 10 determines a relative relationship between the host vehicle and the target by synthesizing the relative relationship between the host vehicle and the target obtained by the radar sensor 17a and the relative relationship between the host vehicle and the target obtained by the camera sensor 17b.

Further, the camera sensor 17b is configured to recognize lane markers such as division lines of right and left white lines of a road or the like (hereinafter, simply called "white lines"), based on the right and left pieces of image data captured, and to calculate and output the shape of the road and a positional relationship (for example, distance between the right end or left end of a traveling lane and the central position of the host vehicle in its vehicle-width direction) between the road and the vehicle. Further, the camera sensor 17b is configured to calculate and output information (which may be called "recognition distance information") indicating up to how many meters ahead of the front white line the camera sensor 17b recognizes.

The information relating to the target acquired by the peripheral sensor 17 is called target information. The peripheral sensor 17 repeatedly transmits the target information to the driving assistance ECU 10 with a predetermined period. Further, the information indicating the shape of a road along which the host vehicle is traveling and a positional relationship between the road and the host vehicle may have information of a navigation system used therein.

An operation switch 18 is a switch operated by a driver. A driver can select whether to execute lane trace control (LTC) by operating the operation switch 18. Further, the driver can select whether to execute adaptive cruise control (ACC) by operating the operation switch 18.

A yaw rate sensor 19 is configured to detect the yaw rate of the host vehicle, and to output an actual yaw rate YRt.

The driving assistance ECU 10 is configured to be able to execute the lane trace control and the adaptive cruise control.

The engine ECU 30 is connected to an engine actuator 31. The engine actuator 31 is an actuator for changing the operating state of an internal-combustion engine 32. In the present example, the internal-combustion engine 32 is a gasoline fuel injection spark-ignited multi-cylinder engine, and includes a throttle valve for adjusting the amount of intake air. The engine actuator 31 includes, at least, a throttle valve actuator that changes the degree of opening of the throttle valve. The engine ECU 30 can change a torque generated by the internal-combustion engine 32 by driving the engine actuator 31. The torque generated by the internal-combustion engine 32 is configured to be transmitted to the drive wheels (not shown) through a transmission (not shown). Therefore, the engine ECU 30 can control a drive force of the host vehicle and change an acceleration state (acceleration) by controlling the engine actuator 31.

The brake ECU 40 is connected to a brake actuator 41. The brake actuator 41 is provided in a hydraulic pressure circuit between a master cylinder (not shown) that pressurizes a hydraulic oil through the tread force of a brake pedal and a friction brake mechanism 42 provided in right and left front-rear wheels. The friction brake mechanism 42 includes a brake disc 42a fixed to a wheel and a brake caliper 42b fixed to a vehicle body. The brake actuator 41 adjusts hydraulic pressure supplied to a wheel cylinder built into the brake caliper 42b in accordance with an instruction from the brake ECU 40, and brings the wheel cylinder into operation through the hydraulic pressure, to thereby push the brake pad against the brake disc 42a and generates a friction braking force. Therefore, the brake ECU 40 can control the braking force of the host vehicle by controlling the brake actuator 41.

The steering ECU 60 is a control device of a well-known electric power steering system, and is connected to a motor driver 61. The motor driver 61 is connected to a steering motor 62. The steering motor 62 is incorporated into a "steering mechanism including a steering wheel, a steering shaft connected to the steering wheel, a steering gear mechanism and the like" of the vehicle which are not shown. The steering motor 62 generates a torque through electric power supplied from the motor driver 61, and thus can apply a steering assist torque through the torque or steer the right and left steering wheels. That is, the steering motor 62 can change the steering of the host vehicle.

The meter ECU 70 is connected to a digital display meter (not shown), and is also connected to a hazard lamp 71 and a stop lamp 72. The meter ECU 70 can blink the hazard lamp 71 in accordance with an instruction from the driving assistance ECU 10, and can turn on the stop lamp 72.

The warning ECU 80 is connected to a buzzer 81 and an indicator 82. The warning ECU 80 can warn a driver by sounding the buzzer 81 in accordance with an instruction from the driving assistance ECU 10. In addition, the warning ECU 80 can also cause the indicator 82 to turn on a warning mark (for example, warning lamp), to display a warning image, to display a warning message, or to display an operation situation of driving assistance control. Meanwhile, the indicator 82 is a display device that displays an image according to a command of the driving assistance ECU 10. Specifically, the indicator 82 is a head-up display. However, the indicator 82 may be other displays including a multi-function display.

The navigation ECU 90 is connected to a GPS receiver 91 that receives a GPS signal for detecting the current position of the host vehicle, a map database 92 storing map information or the like, a touch panel type display 93 which is a human-machine interface, and the like. The navigation ECU 90 specifies the position of the host vehicle at the current point in time (inclusive of information for specifying along which lane the host vehicle travels in a case where the host vehicle travels along a road having a plurality of lanes) based on the GPS signal. The navigation ECU 90 performs various calculation processes based on the position of the host vehicle, the map information stored in the map database 92, and the like, and performs route guidance using the display 93.

Road information is included in the map information stored in the map database 92. Further, the road information includes the curvature radius, curvature or the like of a road indicating the degree of bending of the road. Meanwhile, the curvature is a reciprocal of the curvature radius.

Outline of Operation

Next, an outline of the operation of the present device will be described. The driving assistance ECU 10 of the present device is configured to be able to execute the lane trace control (LTC) and the adaptive cruise control (ACC). Hereinafter, "the lane trace control and the adaptive cruise control" will be described.

Adaptive Cruise Control (ACC)

The adaptive cruise control is control for causing a host vehicle 100 to follow a preceding vehicle traveling along the immediate front of the host vehicle 100 while maintaining an inter-vehicle distance between the preceding vehicle and the host vehicle 100 to a predetermined distance, based on the target information. The adaptive cruise control itself is well known (see, for example, Japanese Unexamined Patent Application Publication No. 2014-148293 (JP 2014-148293A), Japanese Unexamined Patent Application Publication No. 2006-315491 (JP 2006-315491A), Japanese Patent No. 4172434 (JP 4172434B), and Japanese Patent No. 4929777 (JP 4929777B)). Therefore, hereinafter, a simple description will be given.

In a case where the adaptive cruise control is requested by the operation of the operation switch 18, the driving assistance ECU 10 executes the adaptive cruise control.

More specifically, in a case where the adaptive cruise control is requested, the driving assistance ECU 10 selects a following target vehicle based on the target information acquired by the peripheral sensor 17. For example, the driving assistance ECU 10 determines whether the relative position of the detected target (n) specified from the inter-vehicle distance Dfx(n) and the lateral distance Dfy(n) of the target (n) is present within a following target vehicle area determined in advance so that the absolute value of the lateral distance becomes smaller as the inter-vehicle distance increases. In a case where the relative position of the target is present within the following target vehicle area over a predetermined time or more, the target (n) is selected as a following target vehicle.

Further, the driving assistance ECU 10 calculates target acceleration Gtgt in accordance with any of the following Expressions (2) and (3). In Expressions (2) and (3), Vfx(a) is the relative speed of a following target vehicle (a), k1 and k2 are predetermined positive gains (coefficients), and ΔD1 is an inter-vehicle deviation (=Dfx(a)−Dtgt) obtained by subtracting "a target inter-vehicle distance Dtgt from an inter-vehicle distance Dfx(a) of the following target vehicle (a)". Meanwhile, the target inter-vehicle distance Dtgt is calculated by multiplying a target inter-vehicle time Ttgt set by a driver using the operation switch 18 by the vehicle speed SPD of the host vehicle 100 (that is, Dtgt=Ttgt·SPD).

The driving assistance ECU 10 determines the target acceleration Gtgt using the following Expression (2) in a case where a value (k1·ΔD1+k2·Vfx(a)) is positive or "zero". Here, ka1 is a positive gain (coefficient) for acceleration, and is set to a value equal to or less than "1". The driving assistance ECU 10 determines the target acceleration Gtgt using the following Expression (3) in a case where the value (k1·ΔD1+k2·Vfx(a)) is negative. Here, kd1 is a positive gain (coefficient) for deceleration, and is set to "1" in the present example.

$$Gtgt(\text{acceleration})=ka1\cdot(k1\cdot\Delta D1+k2\cdot Vfx(a)) \tag{2}$$

$$Gtgt(\text{deceleration})=kd1\cdot(k1\cdot\Delta D1+k2\cdot Vfx(a)) \tag{3}$$

Meanwhile, in a case where a target is not present in the following target vehicle area, the driving assistance ECU 10 determines the target acceleration Gtgt so that the vehicle speed SPD of the host vehicle 100 is coincident with a "target speed which is set in accordance with the target inter-vehicle time Ttgt", based on the target speed and the vehicle speed SPD.

The driving assistance ECU 10 controls the engine actuator 31 using the engine ECU 30 so that the acceleration of the vehicle is coincident with the target acceleration Gtgt, and controls the brake actuator 41, as needed, using the brake ECU 40.

Lane Trace Control (LTC)

The driving assistance ECU 10 executes the lane trace control in a case where the lane trace control is requested by the operation of the operation switch 18. Meanwhile, the driving assistance ECU 10 executes the lane trace control during the execution of the adaptive cruise control.

In the lane trace control called LTC, the driving assistance ECU 10 sets a target traveling line (target traveling road) Ld with the utilization of the white line, the traveling trajectory of the preceding vehicle (which may be called the "preceding vehicle trajectory"), or the two described above. The driving assistance ECU 10 gives a steering torque to a steering mechanism to change the steering of the host vehicle so that the lateral position of the host vehicle (that is, position of the host vehicle in its vehicle-width direction with respect to a road) is maintained in the vicinity of the target traveling line Ld within a "lane (traveling lane) along which the host vehicle is traveling", and thereby assists a driver's steering operation.

Figure 2:
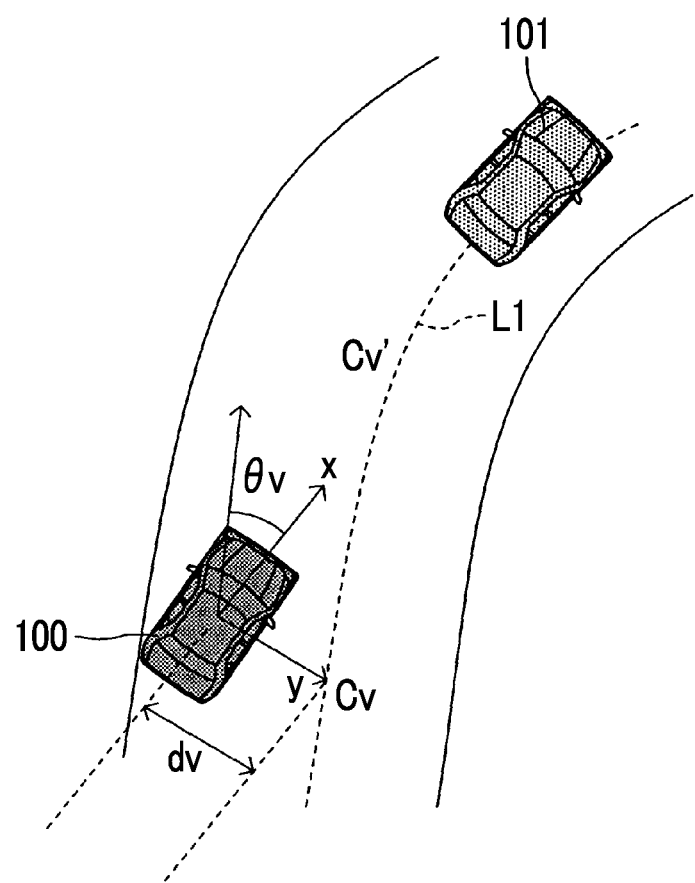
FIG. 2 is a plan view illustrating lane trace control.

As shown in FIG. 2, the driving assistance ECU 10 specifies a preceding vehicle 101 which is a target for creation of a preceding vehicle trajectory L1, and creates the preceding vehicle trajectory L1 based on the target information such as position information of the preceding vehicle 101 relating to the position of the host vehicle 100 for each predetermined elapsed time.

Figures 3A, 3B, 3C:
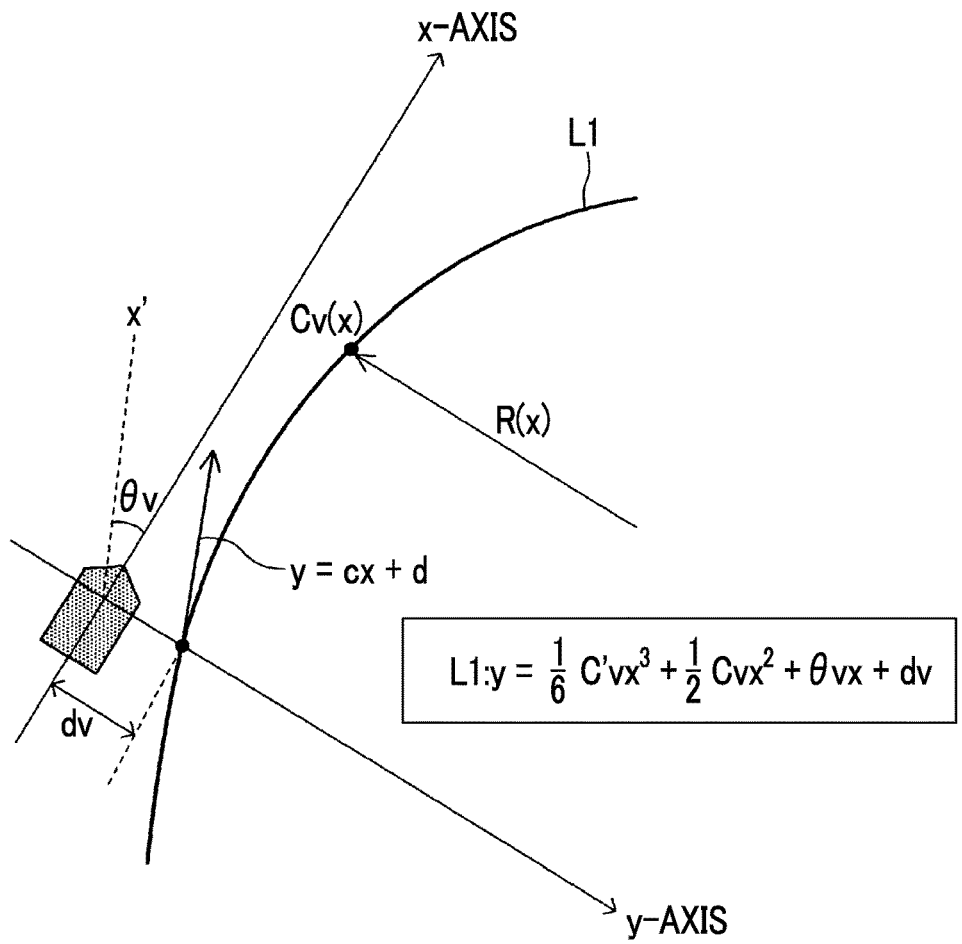
FIG. 3A is a plan view illustrating lane trace control.
FIG. 3B is a mathematical expression illustrating a relationship between a curvature and coefficients or the like of a cubic function of the preceding trajectory of a preceding vehicle.
FIG. 3C is a mathematical expression illustrating a relationship between a curvature and coefficients or the like of a cubic function of the preceding trajectory of the preceding vehicle.

As shown in FIG. 3A, in a case where, using the current position of the host vehicle 100 as the origin, the central axis of the host vehicle 100 extending in its front-rear direction is set to an x-axis, and an axis orthogonal to the x-axis is set to a y-axis, the preceding vehicle trajectory L1 is defined as a curve represented by the cubic function of the following Expression (A).

$$y=(1/6)Cv'x^3+(1/2)Cv\cdot x^2+\theta v\cdot x+dv \quad \text{Expression (A)}$$

Here, Cv' is a curvature change rate (amount of curvature change per unit distance (Δx) at an arbitrary position (x=x0, x0 is an arbitrary value) on the curve), Cv is the curvature of the preceding vehicle trajectory L1 at a position (x=0, y=dv) corresponding to the current position (x=0, y=0) of the host vehicle 100, θv is a deviation angle (yaw angle) between the direction of the preceding vehicle trajectory L1 at the current position (x=0, y=0) of the host vehicle 100 and the traveling direction (+direction of the x-axis) of the host vehicle 100, and dv is a distance (center distance) between the front-end central position of the host vehicle 100 at the current position (x=0, y=0) and the preceding vehicle trajectory L1 in a road-width direction.

Expression (A) is derived as described below. That is, as shown in FIG. 3B, the preceding vehicle trajectory L1 is defined as f(x)=ax³+bx²+cx+d, and in a case where relational expressions and conditions shown in FIG. 3B are used, a relationship between coefficients, curvatures and the like of the cubic function shown in FIG. 3C can be derived. The coefficients a, b, c and d of the cubic function f(x) indicate a curvature change rate Cv' of the preceding vehicle trajectory L1, a curvature Cv of the preceding vehicle trajectory L1 at a position corresponding to the current position of the host vehicle 100, a yaw angle θv, and a center distance dv, respectively. Therefore, it is possible to replace the coefficient a of f(x) by the curvature change rate Cv', to replace the coefficient b by Cv, to replace the coefficient c by the yaw angle θv, and to replace the coefficient d by the center distance dv. Thereby, the cubic function of Expression (A) is derived.

In a case where the created preceding vehicle trajectory L1 is set to the target traveling line Ld, it is possible to acquire target route information (curvature (and curvature change rate) of the target traveling line Ld, yaw angle with respect to the target traveling line Ld, and center distance) needed for the lane trace control, as shown in FIG. 2, from the coefficients of the cubic function of Expression (A).

More specifically, the driving assistance ECU 10 specifies the preceding vehicle 101 (target) which is a target for creation of the preceding vehicle trajectory L1. The peripheral sensor 17 repeatedly transmits the target information to the driving assistance ECU 10 with a predetermined period every time a predetermined time has elapsed.

The driving assistance ECU 10 acquires information, needed for the creation of the preceding vehicle trajectory L1, such as coordinate values of x-y coordinates (coordinate values in which, using the current position of the host vehicle 100 as the origin, the central axis of the host vehicle 100 extending in its front-rear direction is set to an x-axis, and an axis orthogonal to the x-axis is set to a y-axis) determined based on the received target information, the vehicle speed of the host vehicle 100, and the yaw rate of the host vehicle 100. Meanwhile, the vehicle speed of the host vehicle 100 is acquired from the vehicle speed sensor 16, and the yaw rate of the host vehicle 100 is acquired from the yaw rate sensor 19.

In a case where the acquired information is input to a Kalman filter (not shown) included in the driving assistance ECU 10, the driving assistance ECU 10 generates the preceding vehicle trajectory L1 defined as the cubic function of Expression (A). The curvature Cv of the preceding vehicle trajectory L1 at the current position of the host vehicle 100, the curvature change rate Cv' of the preceding vehicle trajectory L1, the yaw angle θv of the host vehicle 100 with respect to the preceding vehicle trajectory L1, and the center distance dv between the preceding vehicle trajectory L1 and the current position of the host vehicle 100, which are the coefficients of the cubic function of Expression (A), are output from the Kalman filter.

Further, in a case where the preceding vehicle trajectory L1 is generated, the driving assistance ECU 10 acquires target route information (curvature (and curvature change rate) yaw angle, and center distance) needed for the lane trace control, as follows, in accordance with the recognition situation of the white line of the camera sensor 17b determined based on the "recognition distance information" which is output from the camera sensor 17b, and performs the lane trace control using the acquired target route information.

In Case Where Far White Line Is Able to Be Recognized

In a case where the camera sensor 17b is able to recognize a far white line, the driving assistance ECU 10 acquires target route information (curvature CL (and curvature change rate CL'), yaw angle θL, and center distance dL) needed for the lane trace control, based on the recognizable far white line. Meanwhile, the recognition situation of the white line in which the camera sensor 17b is able to recognize a far white line may also be called, for convenience, a "first recognition situation" or a "far-side recognizable situation".

Figure 4:
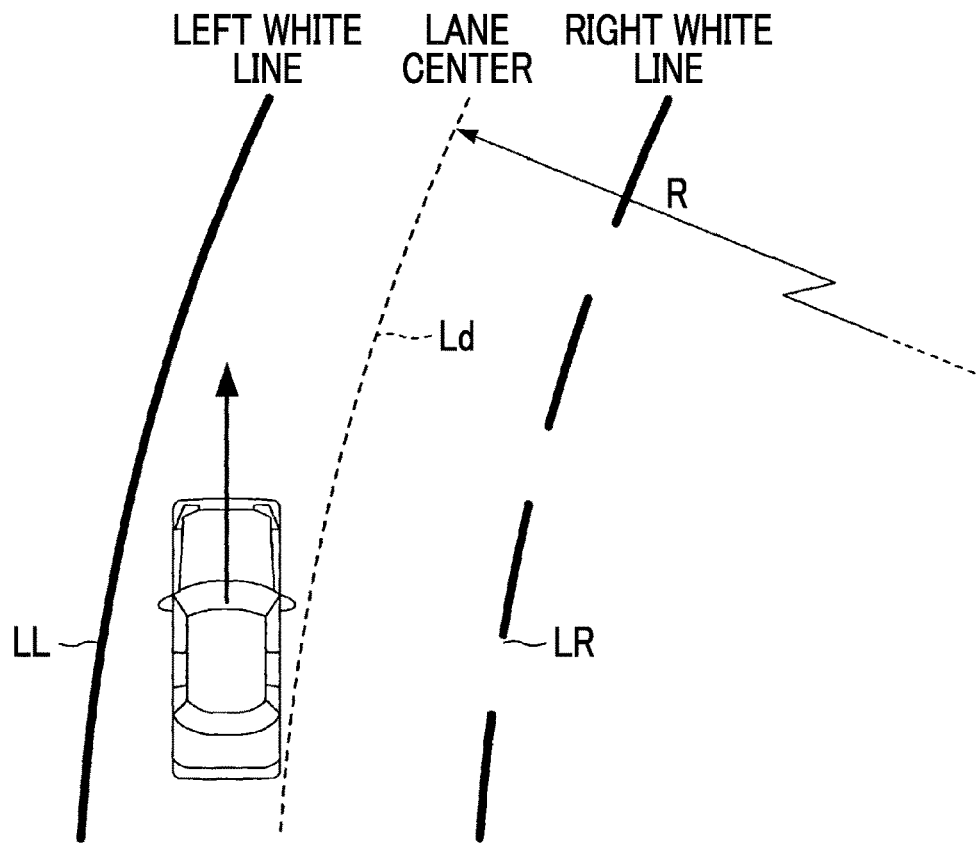
FIG. 4 is a plan view illustrating a left white line, a right white line, a target traveling line and a curve radius.

Specifically, as shown in FIG. 4, the driving assistance ECU 10 acquires "a right white line LR and a left white line LL" of a traveling lane along which the host vehicle 100 is traveling, based on information transmitted from the peripheral sensor 17 (such as white line information capable of being recognized by the camera sensor 17b). The driving assistance ECU 10 determines the central position of a pair of acquired white lines as the target traveling line Ld. Meanwhile, the driving assistance ECU 10 may determine a position located within a predetermined lateral distance in a lane-width direction from the central position of the acquired white lines as the target traveling line Ld. Meanwhile, the "position located within a predetermined lateral distance from the central position of the acquired white lines" is, for example, a position (except the central position) located in an area between "a position located at the central side of half the distance of the vehicle width of the host vehicle 100 from the left white line LL" and "a position located at the central side of half the distance of the vehicle width of the host vehicle 100 from the right white line LR".

Further, the driving assistance ECU 10 calculates the curve radius R and curvature CL=1/R of the target traveling line Ld, and the position and direction of the host vehicle 100 in a traveling lane divided by the left white line LL and the right white line LR.

Figure 5:
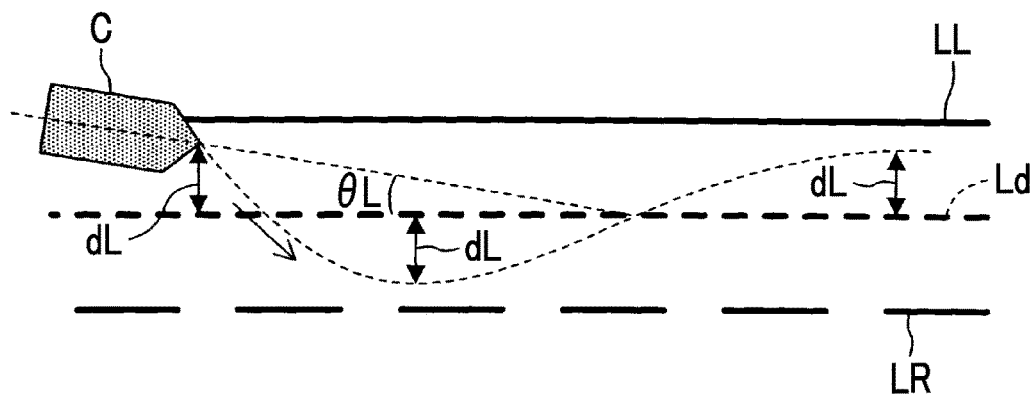
FIG. 5 is a plan view illustrating lane trace control.

As shown in FIG. 5, the driving assistance ECU 10 calculates the distance dL (center distance dL) between the front-end central position of the host vehicle 100 and the target traveling line Ld in a road-width direction, and the deviation angle θL (yaw angle θL) between the direction of the target traveling line Ld and the traveling direction of the host vehicle 100. Thereby, the target route information needed for the lane trace control is acquired.

The driving assistance ECU 10 calculates a target yaw rate YRc* with a predetermined calculation period, using the following Expression (1), based on the center distance dL, the yaw angle θL and the curvature CL. In Expression (1), K1, K2 and K3 are control gains. The target yaw rate YRc* is a yaw rate which is set so that the host vehicle 100 can travel along the target traveling line Ld.

$$YRc^* = K1 \times dL + K2 \times \theta L + K3 \times CL \quad (1)$$

The driving assistance ECU 10 calculates a target steering torque Tr* for obtaining the target yaw rate YRc* with a predetermined calculation period, based on the target yaw rate YRc* and an actual yaw rate YRt. More specifically, the driving assistance ECU 10 stores in advance a look-up table in which a relationship between the target steering torque Tr* and a deviation between the target yaw rate YRc* and the actual yaw rate Yrt is specified, and calculates the target steering torque Tr* by applying the deviation between the target yaw rate YRc* and the actual yaw rate Yrt to the table.

The driving assistance ECU 10 controls the steering motor 62 using the steering ECU 60 so that the actual steering torque Tra is coincident with the target steering torque Tr*. In this manner, the driving assistance ECU 10 executes the lane trace control for controlling the steering (steering angle) of the host vehicle 100 so as to make the host vehicle 100 travel along the target traveling line Ld.

In Case Where Solely Near White Line Is Able to Be Recognized

Figure 6A:
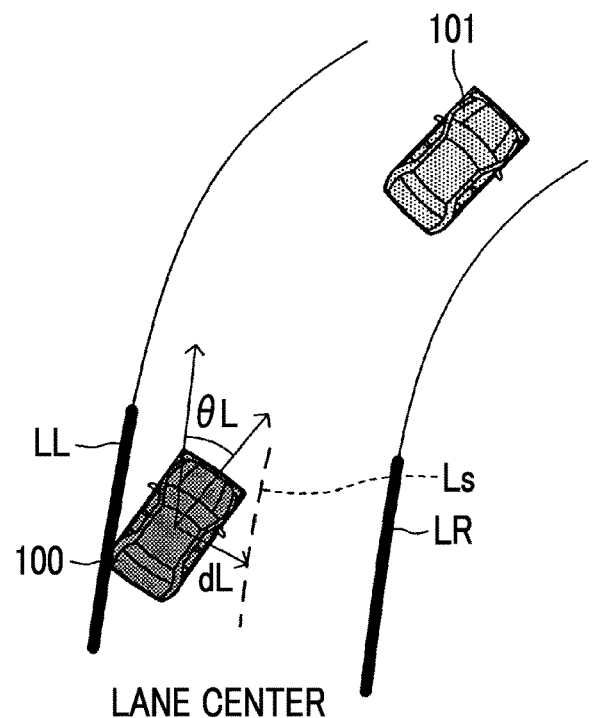
FIG. 6A is a plan view illustrating lane trace control.

In a case where the camera sensor 17b is able to recognize solely a near white line (that is, in a case where a far white line is unable to be recognized, and a near white line is able to be recognized), as shown in FIG. 6A, the driving assistance ECU 10 acquires a near white line LR and a near white line LL, shown by bold lines, which are able to be recognized when the lane trace control is executed. The driving assistance ECU 10 determines the central position of the acquired white lines as a near target traveling line Ls.

Meanwhile, the recognition situation of a white line in which the camera sensor 17b is able to recognize solely a near white line may also be called, for convenience, a "second recognition situation" or a "near-side recognizable situation".

Figure 6B:
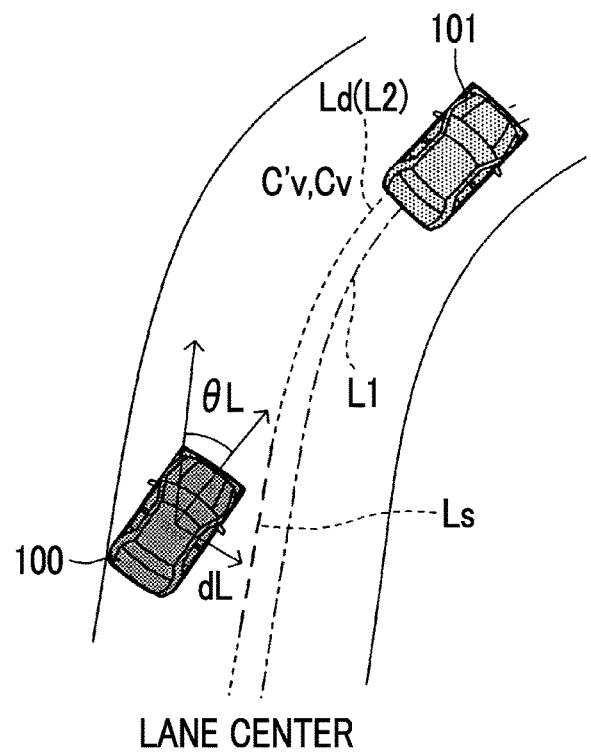
FIG. 6B is a plan view illustrating lane trace control.

As shown in FIG. 6B, the driving assistance ECU 10 applies the position and direction of the near target traveling line Ls, determined based on the near white line LR and the near white line LL which are able to be recognized, to the preceding vehicle trajectory L1 shown by a dashed-dotted line. Thereby, the preceding vehicle trajectory L1 is corrected so as to form a trajectory in which the shape of the preceding vehicle trajectory L1 is maintained, the trajectory being coincident with the position of the near target traveling line Ls, the direction (tangential direction) of the line Ls and a position corresponding to the near target traveling line Ls. The driving assistance ECU 10 sets a preceding vehicle trajectory that is corrected (which may be called a "corrected preceding vehicle trajectory") L2 to the target traveling line Ld.

Meanwhile, the corrected preceding vehicle trajectory L2 may be a trajectory in which the preceding vehicle trajectory L1 is corrected as follows. That is, the corrected preceding vehicle trajectory L2 may be a trajectory in which the preceding vehicle trajectory L1 is corrected so as to form a trajectory in which the shape of the preceding vehicle trajectory L1 is maintained, the trajectory being coincident with the position of the near target traveling line Ls and a position corresponding to the near target traveling line Ls. Further, the corrected preceding vehicle trajectory L2 may be a trajectory in which the preceding vehicle trajectory L1 is corrected so as to form a trajectory in which the shape of the preceding vehicle trajectory L1 is maintained, the trajectory being coincident with the direction (tangential direction) of the near target traveling line Ls and a position corresponding to the near target traveling line Ls.

The driving assistance ECU 10 acquires target route information needed for the lane trace control, based on the target traveling line Ld (corrected preceding vehicle trajectory L2). Specifically, the driving assistance ECU 10 calculates the center distance dL and the yaw angle θL with respect to the corrected preceding vehicle trajectory L2 (near target traveling line Ls) which is determined.

Further, the driving assistance ECU 10 acquires the curvature Cv (and curvature change rate Cv') based on the corrected preceding vehicle trajectory L2 (preceding vehicle trajectory L1). From the above, the driving assistance ECU 10 acquires the target route information (curvature Cv (and curvature change rate Cv'), center distance dL, and yaw angle θL) needed for the lane trace control.

Similarly to the above except that CL of Expression (1) is replaced by Cv, the driving assistance ECU 10 executes the lane trace control for controlling the steering of the host vehicle 100 so as to make the host vehicle 100 travel along the target traveling line Ld.

In Case Where White Line Is Unable to Be Recognized

In a case where the camera sensor 17b is unable to recognize a white line (that is, in a case where a far white line is unable to be recognized, and a near white line is also unable to be recognized), the driving assistance ECU 10 acquires the curvature Cv (and curvature change rate Cv'), the yaw angle θv and the center distance dv, based on solely the preceding vehicle trajectory L1. In other words, the driving assistance ECU 10 sets the preceding vehicle trajectory L1 to the target traveling line Ld in a state where the preceding vehicle trajectory is not corrected. Meanwhile, the recognition situation of a white line in a case where the camera sensor 17b is unable to recognize the white line may also be called, for convenience, a "third recognition situation" or a "non-recognition situation".

Similarly to the above except that dL of Expression (1) is replaced by dv, θL is replaced by θv, and CL is replaced by Cv, the driving assistance ECU 10 executes the lane trace control for controlling the steering of the host vehicle 100 so as to make the host vehicle 100 travel along the target traveling line Ld.

Meanwhile, in a case where the preceding vehicle trajectory is unable to be generated in a situation (third recognition situation) in which the white line is unable to be recognized in a range enough to generate the target traveling line Ld, or in a case where the white line is not viewed at all and a preceding vehicle can be determined to depart from a traveling lane, the driving assistance ECU 10 cancels the execution of the lane trace control. That is, in this case, the driving assistance ECU 10 does not perform the lane trace control. The above is the outline of the lane trace control.

Notification of Reliability of Lane Control

Incidentally, the accuracy of the lane trace control performed by the driving assistance ECU 10 varies depending on the recognition situation of the white line of the camera sensor 17b. In the lane trace control utilizing the preceding vehicle trajectory L1, since the preceding vehicle 101 does not necessarily travel along the center of the traveling lane and the preceding vehicle trajectory L1 may deviate from the vicinity of the center of the traveling lane, the accuracy of the lane trace control tends to decrease as compared with the lane trace control based on the white line.

More specifically, in a case where the recognition situation of the white line of the camera sensor 17b is the first recognition situation, the driving assistance ECU 10 sets the target traveling line Ld based on the recognizable far white line, and acquires target route information needed for the lane trace control. Therefore, in this case, the accuracy of the lane trace control becomes the highest.

In a case where the recognition situation of the white line of the camera sensor 17b is the second recognition situation, the driving assistance ECU 10 sets the corrected preceding vehicle trajectory L2 obtained by correcting the preceding vehicle trajectory L1 to the target traveling line Ld, based on the recognizable near white line, and acquires target route information. Therefore, in this case, the accuracy of the lane trace control tends to decrease more than that of the lane trace control in a case of the first recognition situation. On the other hand, the accuracy of the lane trace control tends to increase more than that of the lane trace control in a case of the third recognition situation described next.

In a case where the recognition situation of the white line of the camera sensor 17b is the third recognition situation, the driving assistance ECU 10 sets the preceding vehicle trajectory L1 to the target traveling line Ld in a state where the preceding vehicle trajectory is not corrected, and acquires target route information. Therefore, in this case, the accuracy of the lane trace control tends to decrease more than that of the lane trace control in the case of the first recognition situation and the second recognition situation.

That is, when the driving assistance ECU 10 executes the lane trace control in a case where the camera sensor 17b is in the second recognition situation, there is a higher possibility that the traveling of the host vehicle 100 in the vicinity of the center of the traveling lane is unable to be maintained than when the lane trace control in a case of the first recognition situation is executed.

When the driving assistance ECU 10 executes the lane trace control in a case where the camera sensor 17b is in the third recognition situation, there is a higher possibility that the traveling of the host vehicle 100 in the vicinity of the center of the traveling lane is unable to be maintained than when the lane trace control in a case of the first recognition situation and the lane trace control in a case of the second recognition situation are executed.

In a case where the accuracy of the lane trace control varies depending on the recognition situation of the white line of the camera sensor 17b in this manner, there is a relatively high possibility of a driver having a sense of discomfort (sense of distrust) in the lane trace control.

On the other hand, the driving assistance ECU 10 of the present device is configured to notify a driver of the degree of reliability (degree of accuracy) of the lane trace control. Specifically, the driving assistance ECU 10 is configured to display an image indicating the degree of reliability of the lane trace control on the indicator 82 in accordance with a method of setting the target traveling line Ld selected depending on the recognition situation of the white line during the execution of the lane trace control.

Thereby, since the driving assistance ECU 10 can cause a driver to recognize the reliability of the lane trace control which is being executed, it is possible to further reduce the possibility of the driver having a sense of discomfort (sense of distrust) in the lane trace control.

Figure 7A:
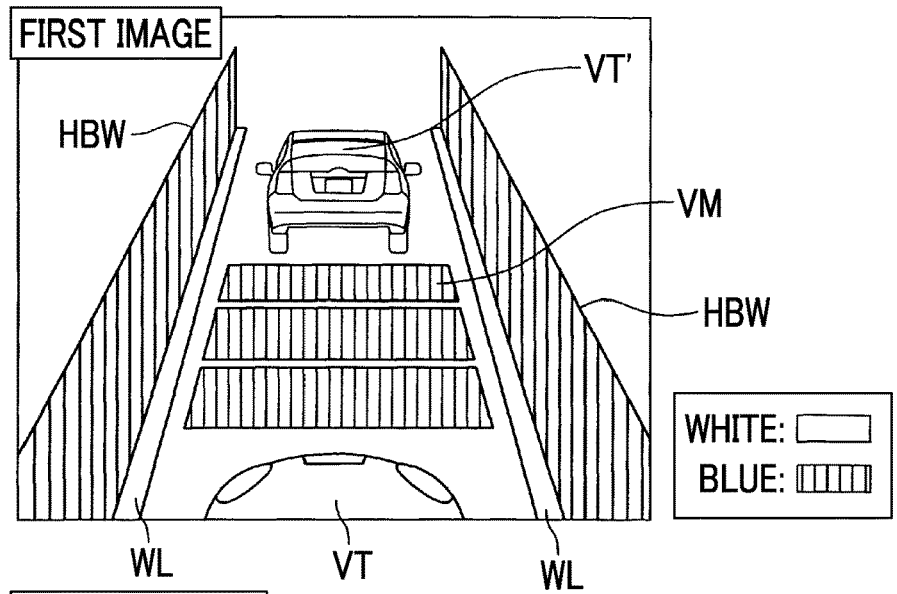
FIG. 7A is a schematic diagram illustrating an example of a display image.

Specifically, when the target traveling line Ld is set based on the white line and the lane trace control is executed in a case where the recognition situation of the white line is the first recognition situation and the preceding vehicle 101 is able to be specified, the driving assistance ECU 10 displays a first image (image showing a further increase in the reliability of the control) shown in FIG. 7A on the indicator 82.

In the first image shown in FIG. 7A, a front end portion VT of the vehicle is shown in the vicinity of the lower end of the central portion of the first image, two white lines WL are shown on both the right and left sides of the front end portion VT of the vehicle, and a high blue wall HBW is further shown outside each of the white lines WL. Further, barometers VM indicating an inter-vehicle distance between the vehicle and a front vehicle are shown in an area in front of the front end portion VT, and a rear portion VT' of the front vehicle is shown.

Meanwhile, when the target traveling line Ld is set based on the white line and the lane trace control is executed in a case where the recognition situation of the white line is the first recognition situation and the preceding vehicle 101 is unable to be specified, the driving assistance ECU displays an image (not shown), different solely in that the rear portion VT' of the front vehicle is omitted from the image shown in FIG. 7A, on the indicator 82.

Figure 7B:
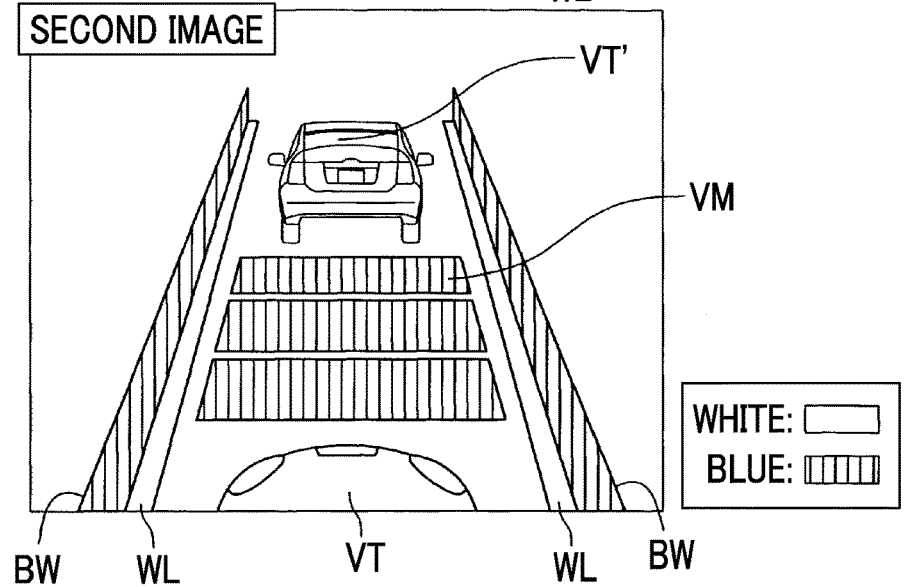
FIG. 7B is a schematic diagram illustrating an example of a display image.

When the recognition situation of the white line is the second recognition situation and the corrected preceding vehicle trajectory L2 created based on the near white line and the preceding vehicle trajectory L1 is set to the target traveling line Ld to execute the lane trace control, the driving assistance ECU 10 displays a second image (image showing a further decrease in the reliability of the control) shown in FIG. 7B on the indicator 82.

In the second image shown in FIG. 7B, the front end portion VT of the vehicle is shown in the vicinity of the lower end of the central portion of the second image, two white lines WL are shown on both the right and left sides of the front end portion VT of the vehicle, and a blue wall BW having a normal height smaller than that of the high wall HBW is further shown outside each of the white lines WL.

Further, barometers VM are shown in the area in front of the front end portion VT, and the rear portion VT' of the front vehicle is shown.

Figure 7C:
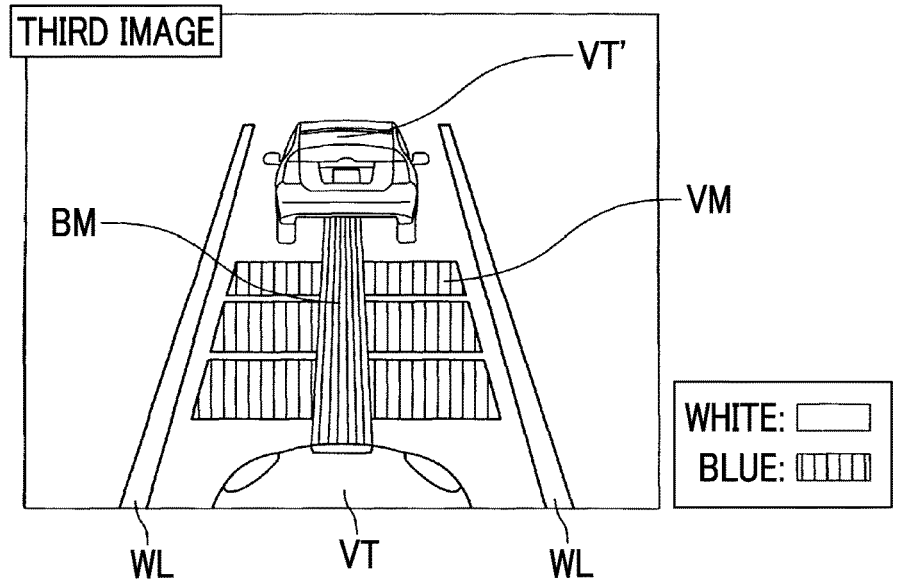
FIG. 7C is a schematic diagram illustrating an example of a display image.

When the recognition situation of the white line is the third recognition situation and the preceding vehicle trajectory L1 is set to the target traveling line Ld to execute the lane trace control, the driving assistance ECU 10 displays a third image (image showing a further decrease in the reliability of the control) shown in FIG. 7C on the indicator 82.

In the third image shown in FIG. 7C, the front end portion VT of the vehicle is shown in the vicinity of the lower end of the central portion of the third image, and two white lines WL are shown on both the right and left sides of the front end portion VT of the vehicle. Meanwhile, a white line on a black ground may be shown in place of the white line WL. Further, barometers VM are shown in the area in front of the front end portion VT, and the rear portion VT' of the front vehicle is shown. Further, a beam BM traveling from the front end portion VT toward the rear portion VT' is shown.

In the first image to third images, the degree of reliability of the lane trace control is shown depending on the height of the wall. That is, a further increase in the reliability of the lane trace control is shown in a case where the height of the wall is large as in the high wall HBW of the first image. A further decrease in the reliability of the lane trace control is shown in a case where the height of the wall is smaller than the high wall HBW of the first image as in the wall BW of the second image. A further decrease in the reliability of the lane trace control is shown in a case where there is no wall as in the third image.

In this manner, the driving assistance ECU 10 performs a notification for appealing to a driver's visual sense by displaying an image indicating the degree of reliability of the lane trace control on the indicator 82, and thus it is possible to cause the driver to intuitively recognize the reliability of the lane trace control which is being currently performed. As a result, it is possible to further reduce the possibility of the driver having a sense of discomfort in the lane trace control.

Specific Operation

Next, a specific operation of the CPU of the driving assistance ECU 10 (which may be simply called the "CPU") will be described. The CPU is configured to execute a routine shown in a flowchart of FIG. 8 every time a predetermined time has elapsed. Meanwhile, the CPU is configured to execute adaptive cruise control through a routine (not shown). The CPU executes the routine shown in FIG. 8 in a case where the adaptive cruise control is executed.

Figure 8:
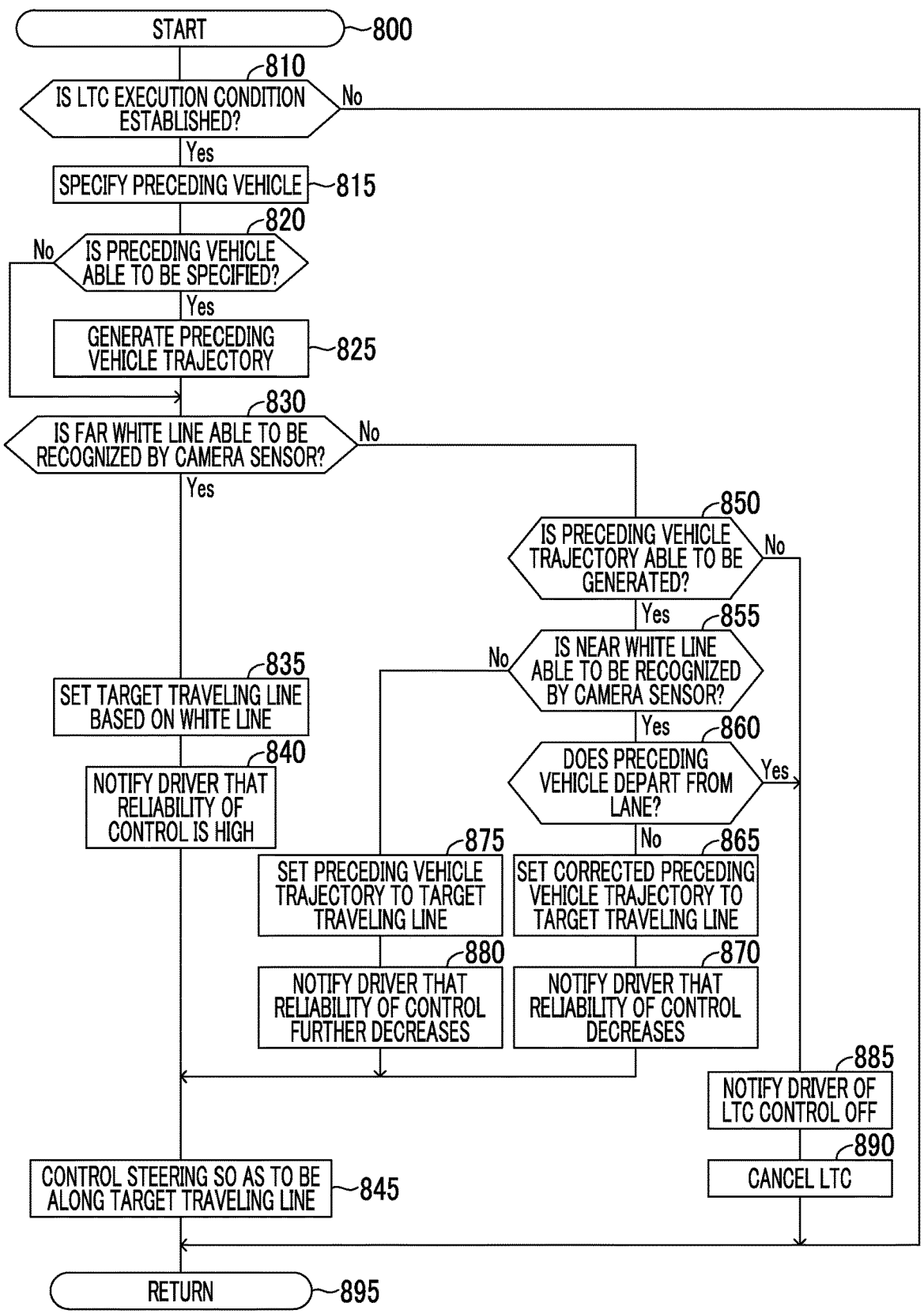
FIG. 8 is a flowchart illustrating a routine which is executed by the CPU of a driving assistance ECU shown in FIG. 1.

Therefore, when a predetermined timing arrives in a case where the adaptive cruise control is executed, the CPU starts the routine of FIG. 8 from step 800 to proceed to step 810, and determines whether the execution condition of the lane trace control (LTC) is established.

In a case where the execution condition of the lane trace control is established, the CPU makes a determination of "Yes" in step 810 followed by proceeding to step 815, and specifies the preceding vehicle 101 which is a target for the generation of the preceding vehicle trajectory L1. Specifically, the CPU acquires the vehicle speed of the host vehicle 100 from the vehicle speed sensor 16, and acquires the yaw rate of the host vehicle 100 from the yaw rate sensor 19. The CPU estimates the traveling direction of the host vehicle 100 from the acquired vehicle speed and yaw rate, and selects a target closest to the host vehicle 100 in its traveling direction, based on the target information sent from the peripheral sensor 17, as the "preceding vehicle 101 which is a target for the generation of the preceding vehicle trajectory L1".

Thereafter, the CPU proceeds to step 820, and determines whether the preceding vehicle 101 which is a target for the generation of the preceding vehicle trajectory L1 is specified. In a case where the preceding vehicle 101 is specified, the CPU makes a determination of "Yes" in step 820 followed by proceeding to step 825.

The CPU stores target information of each target in association with each target, based on the target information from the peripheral sensor 17. In a case where the CPU proceeds to step 825, the CPU selects target information with respect to the preceding vehicle 101 which is specified from the pieces of the target information, and generates the preceding vehicle trajectory L1 with respect to the preceding vehicle 101 based on the selected target information. Thereafter, the CPU proceeds to step 830.

On the other hand, in a case where the preceding vehicle 101 is not specified, the CPU makes a determination of "No" in step 820, and proceeds directly to step 830.

In a case where the CPU proceeds to step 830, the CPU determines whether the white lines (left white line LL and right white line LR) are able to be recognized up to a first predetermined distance based on the "recognition distance information" sent from the camera sensor 17b. In other words, the CPU determines whether a far white line is able to be recognized based on the "recognition distance information" sent from the camera sensor 17b. Meanwhile, in the first predetermined distance, a distance is appropriately set which is appropriate to determine whether a position separated by the first predetermined distance or more is far from the position of the host vehicle 100.

In a case where the white line is able to be recognized up to the first predetermined distance (that is, in a case where the recognition situation of the white line is the above-described first recognition situation), the CPU makes a determination of "Yes" in step 830, and performs processes of step 835 to step 845 described below in order.

Step 835: the CPU sets the target traveling line Ld based on the white line. That is, the CPU determines the central position of the left white line LL and the right white line LR as the target traveling line Ld. Step 840: the CPU notifies a driver of a further increase in the reliability of the control. Specifically, the CPU displays the image (image shown in FIG. 7A) indicating a further increase in the reliability of the control on the indicator 82, and thus notifies a driver of a further increase in the reliability of the control. Step 845: the CPU executes the lane trace control for controlling the steering of the host vehicle 100 so as to make the host vehicle 100 travel along the set target traveling line Ld. Thereafter, the CPU proceeds to step 895, and temporarily terminate the present routine.

On the other hand, in a case where the white line is unable to be recognized up to the first predetermined distance, the CPU makes a determination of "No" in step 830 followed by proceeding to step 850, and determines whether the preceding vehicle trajectory L1 is able to be generated. Specifically, in a case where the preceding vehicle 101 is unable to be specified, or in a case where the preceding vehicle 101 is able to be specified but time-series data of the target information with respect to the preceding vehicle 101 is not sufficient to generate the preceding vehicle trajectory L1, the CPU determines that the preceding vehicle trajectory L1 is unable to be generated. Otherwise, the CPU determines that the preceding vehicle trajectory L1 is able to be generated.

In a case where the preceding vehicle trajectory L1 is able to be generated, the CPU makes a determination of "Yes" in step 850 followed by proceeding to step 855, and determines whether the white lines (left white line LL and right white line LR) are able to be recognized by the camera sensor 17b based on the "recognition distance information" sent from the camera sensor 17b in a range equal to or greater than a second predetermined distance and less than the first predetermined distance. In other words, the CPU determines whether the near white line is able to be recognized by the camera sensor 17b. That is, the CPU determines whether the recognition situation of the white line is the above-described second recognition situation. Meanwhile, the second predetermined distance is set to be smaller than the first predetermined distance.

In a case where the white line is able to be recognized by the camera sensor 17b in the range equal to or larger than the second predetermined distance and less than the first predetermined distance, the CPU makes a determination of "Yes" in step 855 followed by proceeding to step 860, and determines whether the preceding vehicle departs from the traveling lane.

Figure 9:
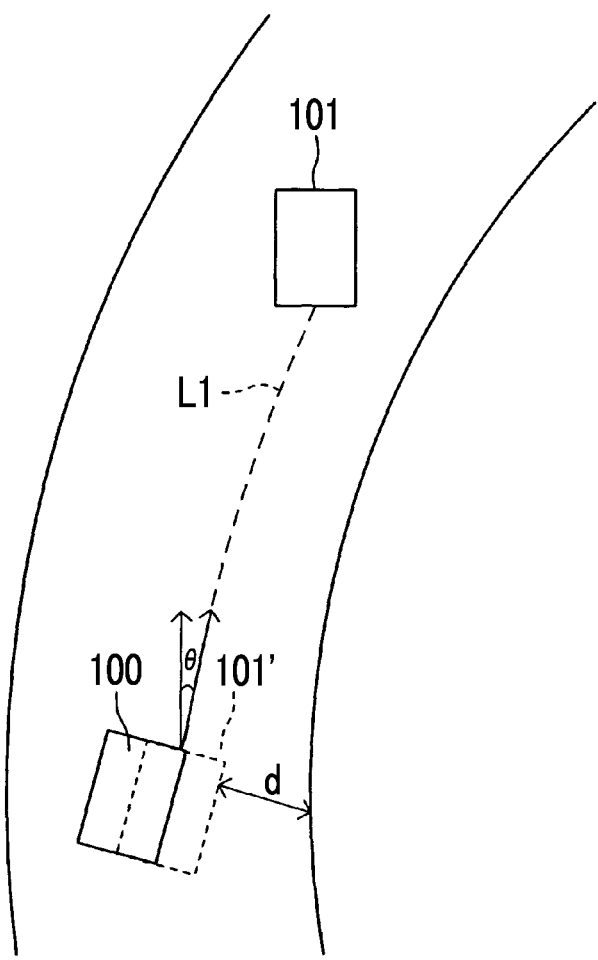
FIG. 9 is a plan view illustrating a determination of whether the preceding vehicle departs from a traveling lane.

Specifically, as shown in FIG. 9, the CPU calculates a distance d between the white line and a past preceding vehicle 101' located on the preceding vehicle trajectory L1 corresponding to the position of the host vehicle 100 at the current point in time, time t1 (=distance d÷lateral speed Vsin θ of the host vehicle 100, θ is a yaw angle of the preceding vehicle 101' with respect to the white line) needed until the past preceding vehicle 101' departs from the white line separated by the distance d, and time t2 elapsed from the past (=distance to the position of the preceding vehicle 101 at the current point in time÷vehicle speed V of the host vehicle 100 at the current point in time).

Meanwhile, the CPU executes the adaptive cruise control, and regards the vehicle speed V of the host vehicle 100 at the current point in time as the vehicle speed of the preceding vehicle, during the calculation of time t1 and time t2, in consideration of a relatively low possibility of the occurrence of a large difference between the vehicle speed of the preceding vehicle 101' and the vehicle speed of the host vehicle 100.

Further, the CPU calculates a departure determination time ta=t1−t2. In a case where the departure determination time ta is less than a predetermined value (for example, less than zero), the CPU determines that the preceding vehicle 101' departs from the traveling lane. In a case where the departure determination time ta is not less than the predetermined value (for example, less than zero), the CPU determines that the preceding vehicle 101' does not depart from the traveling lane.

In a case where the preceding vehicle 101' does not depart from the traveling lane, the CPU makes a determination of "No" in step 860 followed by proceeding to step 865, corrects the preceding vehicle trajectory L1 based on the recognizable near white line, and sets the corrected preceding vehicle trajectory L2 to the target traveling line Ld. Thereby, as compared with a case where the preceding vehicle trajectory L1 is set to the target traveling line Ld as it is, it is possible to reduce the possibility of the host vehicle 100 not being able to travel along the vicinity of the center of the traveling lane. As a result, it is possible to further improve the accuracy of the lane trace control utilizing the preceding vehicle trajectory L1.

Thereafter, the CPU proceeds to step 870, and the CPU notifies a driver of a further decrease in the reliability of the control. Specifically, the CPU displays the image (image shown in FIG. 7B) showing a further decrease in the reliability of the control on the indicator 82, and thus notifies the driver of a further decrease in the reliability of the control.

Thereafter, the CPU proceeds to step 845, and the CPU executes the lane trace control for controlling the steering of the host vehicle 100 so as to make the host vehicle 100 travel along the set target traveling line Ld. Thereafter, the CPU proceeds to step 895, and temporarily terminates the present routine.

On the other hand, in a case where the white line is unable to be recognized by the camera sensor 17b in the range equal to or greater than the second predetermined distance and less than the first predetermined distance, the CPU makes a determination of "No" in step 855 followed by proceeding to step 875, and sets the preceding vehicle trajectory L1 to the target traveling line Ld in a state where the preceding vehicle trajectory is not corrected. That is, in this case, the recognition situation of the white line is the above-described third recognition situation, and thus the CPU sets the preceding vehicle trajectory L1 to the target traveling line Ld.

Thereafter, the CPU proceeds to step 880, and the CPU notifies a driver of a further decrease in the reliability of the control. Specifically, the CPU displays the image (image shown in FIG. 7C) showing a further decrease in the reliability of the control on the indicator 82, and thus notifies the driver of a further decrease in the reliability of the control.

Thereafter, the CPU proceeds to step 845, and the CPU executes the lane trace control for controlling the steering of the host vehicle 100 so as to make the host vehicle 100 travel along the set target traveling line Ld. Thereafter, the CPU proceeds to step 895, and temporarily terminates the present routine.

Meanwhile, a case where the preceding vehicle trajectory L1 is unable to be generated at a point in time of the process of step 850 leads to a situation where it is difficult to set the target traveling line Ld. Therefore, in this case, the CPU makes a determination of "No" in step 850 followed by proceeding to step 885, proceeds to step 890 after a driver is notified that the lane trace control is not performed, and cancels the lane trace control. In this case, the CPU does not perform the lane trace control. Meanwhile, the notification of the lane trace control not being performed is performed by the CPU displaying an image (not shown) indicating that effect on the indicator 82, and sounding the buzzer 81. Thereafter, the CPU proceeds to step 895, and temporarily terminates the present routine.

Further, in a case where the preceding vehicle 101 departs from the traveling lane at a point in time of the process of step 860, there is a relatively high possibility of the preceding vehicle trajectory L1 deviating greatly from the vicinity of the center of the traveling line, and thus it is not preferable to set the preceding vehicle trajectory to the target traveling line Ld. Therefore, in this case, the CPU makes a determination of "Yes" in step 860 followed by proceeding to step 885, proceeds to step 890 after the driver is notified that the lane trace control is not performed, and cancels the lane trace control. Thereafter, the CPU proceeds to step 895, and temporarily terminates the present routine.

Further, in a case where the execution condition of the lane trace control is not established at a point in time of the process of step 810, the CPU makes a determination of "No" in step 810 followed by proceeding to step 895, and temporarily terminates the present routine.

With the present device described above, the following effects are exhibited. In a case of the situation (second recognition situation) where the camera sensor 17b is unable to recognize a far white line and is able to recognize a near white line, the present device corrects the preceding vehicle trajectory L1 along the center of the traveling lane based on the recognizable near white line, and sets the corrected preceding vehicle trajectory L2 to the target traveling line Ld. Thereby, as compared with a case where the preceding vehicle trajectory L1 is set to the target traveling line Ld as it is, it is possible to reduce the possibility of the host vehicle 100 not being able to travel along the vicinity of the center of the traveling lane. As a result, it is possible to further improve the accuracy of the lane trace control utilizing the preceding vehicle trajectory L1.

Further, the present device performs a notification for appealing to a driver's visual sense by displaying an image indicating the degree of reliability of the lane trace control on the indicator 82, and thus it is possible to cause the driver to intuitively recognize the reliability of the lane trace control which is being currently performed. As a result, it is possible to further reduce the possibility of the driver having a sense of discomfort in the lane trace control.

Modification Example

Hereinbefore, the embodiments of the disclosure have been described in detail, but the embodiments of the disclosure are not limited to the above-described embodiments, and can be modified variously based on the technical idea of the disclosure.

For example, the present device may be configured to acquire the position information and the like of the preceding vehicle 101 through vehicle-to-vehicle communication. Specifically, for example, the preceding vehicle 101 may transmit position information of the preceding vehicle itself acquired by a navigation device of the preceding vehicle 101, together with a signal for specifying the preceding vehicle 101 itself, to the host vehicle 100, and the host vehicle 100 may acquire the position information of the preceding vehicle 101 based on the transmitted information. Further, in the present device, a method of generating the preceding vehicle trajectory L1 can have various well-known methods adopted therein without being limited to the above-described examples. For example, in a case where a method is used in which a curve approximating the trajectory of the preceding vehicle 101 can be created, a Kalman filter may not be used. The present device may obtain Cv, Cv', and the like from the approximate curve. Further, in the present device, a method of determining departure from the traveling lane of the preceding vehicle 101 can have various well-known methods adopted therein without being limited to the above-described examples.

What is claimed is:

1. A driving assistance device comprising an electronic control unit configured to
    recognize a division line of a traveling lane along which a vehicle is traveling,
    specify a preceding vehicle traveling in front of the vehicle to generate a traveling trajectory of the specified preceding vehicle, and
    set a target traveling line based on at least one of the division line and the traveling trajectory to execute lane trace control for controlling steering of the vehicle so as to make the vehicle travel along the target traveling line, wherein:
    in a case where a recognition situation of the division line is a near-side recognizable situation in which a forward and far division line of the vehicle is not recognized and a forward and near division line is recognized, the electronic control unit is configured to set, to the target traveling line, a corrected traveling trajectory in which at least one of
        i) a position of a near target traveling line constituted by a central position of the traveling lane determined based on the recognizable forward and near division line or a position located within a predetermined lateral distance from the central position of the traveling lane determined based on the recognizable forward and near division line in a lane-width direction and
        ii) a tangential direction of the near target traveling line is applied to the traveling trajectory to correct the traveling trajectory; and
    the corrected traveling trajectory is a trajectory in which a shape of the traveling trajectory is maintained, the trajectory being coincident with a position corresponding to the near target traveling line and the at least one of the position of the near target traveling line and the tangential direction of the near target traveling line.

2. The driving assistance device according to claim 1, wherein:
    in a case where the recognition situation of the division line is a far-side recognizable situation in which the forward and far division line is recognized, the electronic control unit is configured to set a line, constituted by a central position of the traveling lane determined based on the recognizable forward and far division line or a position located within a predetermined lateral distance from the central position of the traveling lane determined based on the recognizable forward and far division line in a lane-width direction, to the target traveling line; and
    when the lane trace control is executed in a case where the recognition situation of the division line is the near-side recognizable situation, the electronic control unit is configured to notify a driver of the vehicle that reliability of the lane trace control is lower than that in the far-side recognizable situation.

3. The driving assistance device according to claim 1, wherein in a case where the recognition situation of the division line is a far-side recognizable situation in which the forward and far division line is recognized, the electronic control unit is configured to determine the central position of the traveling lane based on a pair of the recognizable forward and far division lines.

4. The driving assistance device according to claim 2, wherein:
    in a case where the recognition situation of the division line is a non-recognition situation in which the forward and far division line is not recognized and the forward and near division line is not recognized, the electronic control unit is configured to set the traveling trajectory to the target traveling line;
    when the lane trace control is executed in the case where the recognition situation of the division line is the far-side recognizable situation, the electronic control unit is configured to notify the driver of the vehicle that the reliability of the lane trace control is high; and
    when the lane trace control is executed in the case where the recognition situation of the division line is the non-recognition situation, the electronic control unit is configured to notify the driver of the vehicle that the reliability of the lane trace control is lower than that in the near-side recognizable situation.

5. The driving assistance device according to claim 4, wherein:

in the case where the recognition situation of the division line is the near-side recognizable situation, the electronic control unit is further configured to determine whether the specified preceding vehicle departs from the traveling lane; and when the specified preceding vehicle is determined to depart from the traveling lane, the electronic control unit is configured not to perform the lane trace control.

* * * * *